(12) United States Patent
Oehmann et al.

(10) Patent No.: US 7,744,229 B2
(45) Date of Patent: Jun. 29, 2010

(54) OUTSIDE REAR VIEW MIRROR FOR VEHICLES, PREFERABLY FOR MOTOR VEHICLES

(75) Inventors: Roland Oehmann, Stuttgart (DE); Kürsat Sonntag, Kettershausen (DE)

(73) Assignee: SMR Patents S.a.r.l., Luxembourg (LU)

( * ) Notice: Subject to any disclaimer, the term of this patent is extended or adjusted under 35 U.S.C. 154(b) by 0 days.

(21) Appl. No.: 11/914,001

(22) PCT Filed: May 8, 2006

(86) PCT No.: PCT/EP2006/004283

§ 371 (c)(1),
(2), (4) Date: Nov. 9, 2007

(87) PCT Pub. No.: WO2006/119948

PCT Pub. Date: Nov. 16, 2006

(65) Prior Publication Data
US 2008/0192369 A1    Aug. 14, 2008

(30) Foreign Application Priority Data
May 11, 2005    (DE) .................. 10 2005 021 757

(51) Int. Cl.
*G02B 7/182* (2006.01)
*B60R 1/06* (2006.01)
(52) U.S. Cl. .................. 359/841; 359/872; 248/900
(58) Field of Classification Search .................. 359/841, 359/872, 877; 248/900
See application file for complete search history.

(56) References Cited
U.S. PATENT DOCUMENTS

| 4,606,619 A | * | 8/1986 | Yamana ...................... 248/549 |
| 4,732,461 A | | 3/1988 | Mittelhauser |
| 4,836,491 A | * | 6/1989 | Fimeri ......................... 248/549 |
| 4,840,475 A | * | 6/1989 | Herzog et al. ............... 359/841 |
| 4,951,912 A | * | 8/1990 | Manzoni ................... 248/475.1 |
| 5,061,056 A | * | 10/1991 | You ........................... 359/872 |
| 5,091,804 A | * | 2/1992 | Seitz .......................... 359/841 |
| 5,477,390 A | * | 12/1995 | Boddy et al. ................ 359/841 |
| 5,959,790 A | * | 9/1999 | Hempelmann ............. 359/841 |
| 6,106,122 A | * | 8/2000 | Gilbert et al. .............. 359/841 |
| 6,234,637 B1 | * | 5/2001 | Juraschek ................... 359/871 |

FOREIGN PATENT DOCUMENTS

| DE | 2856612 | * | 7/1980 |
| DE | 3605210 | * | 8/1987 |
| DE | 4422843 | * | 1/1996 |
| EP | 0023620 | * | 2/1981 |

(Continued)

*Primary Examiner*—Ricky D Shafer
(74) *Attorney, Agent, or Firm*—Reising Ethington P.C.

(57) ABSTRACT

In some embodiments of outer rear-view mirrors, a mirror head (12) and a mirror base (11) are joined together in an articulated manner by a hinge (15, 16). The mirror head (12) can pivot out of a normal operational position in or against the travelling direction (10) and be fixed in the position swivelled against the travelling direction (10). For the outer rear-view mirror to be pivotable out of its normal operational position in or against the travelling direction (10), the intermediate joint (30) has two parallel joint axes arranged between the mirror base and the mirror head, and a U-shaped projection (37). The outer rear-view mirror is advantageously used in motor vehicles.

7 Claims, 10 Drawing Sheets

FOREIGN PATENT DOCUMENTS

| | | |
|---|---|---|
| GB | 2049797 | 12/1980 |
| JP | 58-202127 | * 11/1983 |
| JP | 59008549 | * 1/1984 |
| JP | 59137228 | * 8/1984 |
| JP | 60219137 | 11/1985 |
| JP | 6171244 | 4/1986 |

* cited by examiner

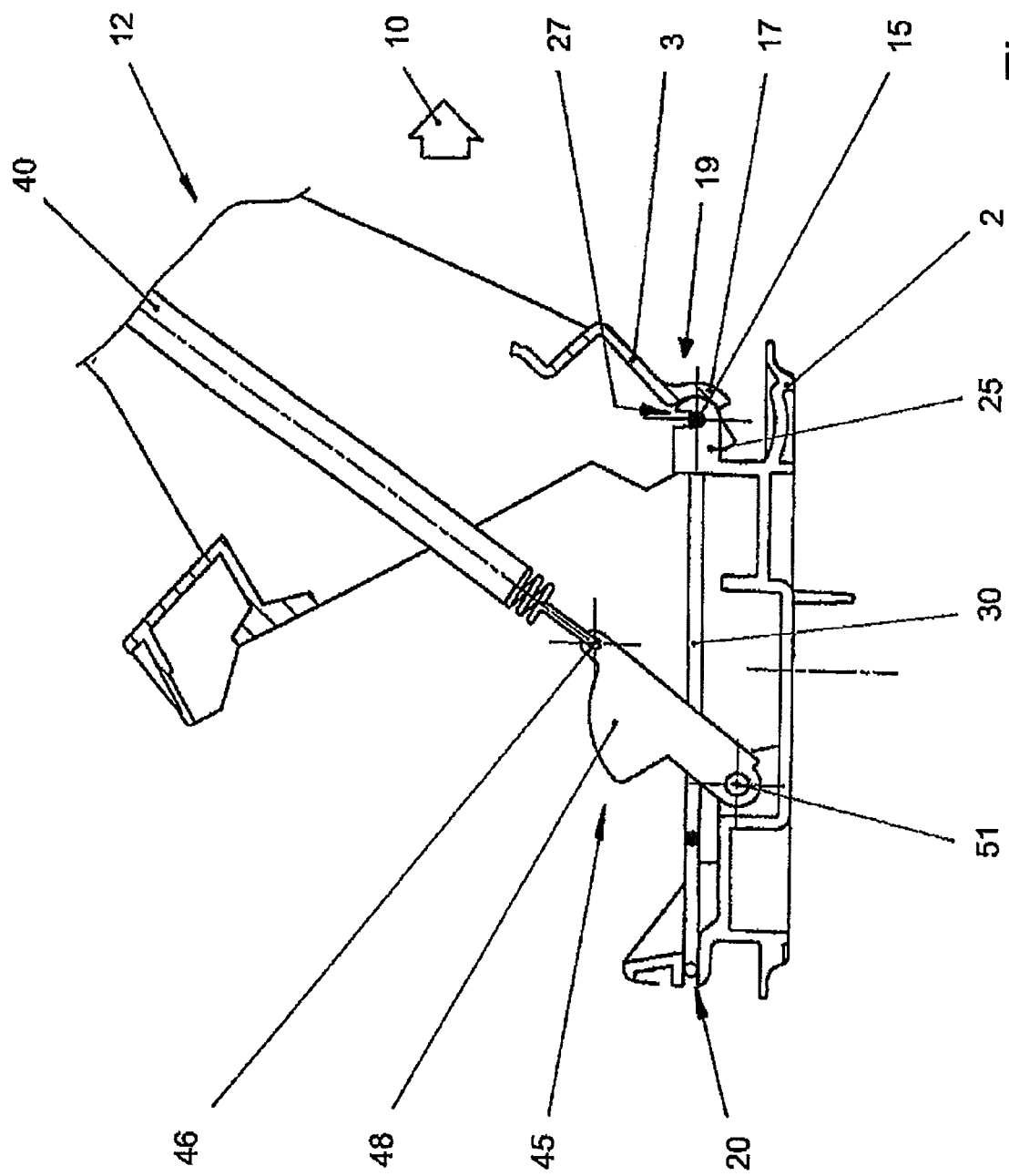

OUTSIDE REAR VIEW MIRROR FOR VEHICLES, PREFERABLY FOR MOTOR VEHICLES

This patent application claims priority to a PCT Patent Application having application number PCT/EP2006/004283, claiming priority from a German patent application having application number DE 10 2005 021 757.5, filed on May 11, 2005.

BACKGROUND ART

1. Field of the Invention

The invention concerns an outside rear view mirror for motor vehicles. More particularly, the invention concerns an outside rear view mirror having a bidirectional pivot mechanism.

2. Description of the Related Art

Outside rear view mirrors are known in the automotive field in which a mirror head and a mirror foot are hinged to each other on both sides via a hinge. It is possible by means of such a hinge for the mirror head to be pivoted from a normal operating position in or against the direction of travel. It is also known that the mirror head pivoted opposite the direction of travel must be securely locked in this pivoted position. Operation for this purpose can occur both by hand and by means of a motor. The outside rear view mirror should be held securely in the pivoted position, whereas operation as free from friction as possible and smooth is desired for the pivot process.

Such mirrors often use an intermediate articulation, which is connected on one side to pivot with the mirror foot and on the other side to pivot with the mirror head. These intermediate articulations, for reasons of stability, are generally made from metal (complex cast part structures) and have demanding bearing designs, stops and/or locking and fastening mechanisms. They require an installation space corresponding to their dimensions and are relatively heavy and cost-intensive to manufacture because of the metal design. The requirement for a mirror pivoted tightly against the vehicle and locked there is of considerable importance for the parking position of vehicles in close parking spaces or during passage during narrow gates. In addition, the hazard of injury to pedestrians by the retracted outside rear view mirrors is significantly reduced in parked vehicles.

The underlying task of the invention is to design the generic outside rear view mirror so that it can be pivoted in or against the direction of travel and is held in a secure parking position with limited force and can be pivoted back into the normal operating position, in which it is particularly compact and cost-effective to manufacture and satisfies all legal requirements.

SUMMARY OF THE INVENTION

The intermediate articulation in the outside rear view mirror according to the invention has two parallel hinge axes that form the pivot axis of a front and rear hinge. The rear hinge in the travel direction can be pivoted in the mirror foot, the front hinge is mounted in the mirror head. Both arms are advantageously connected to each other via a connector whose shape follows the inside contour of the mirror foot and the mirror head. One of the hinge axes, preferably the rear hinge axis is advantageously provided with a U-shaped shoulder as pressure and sliding piece for a parking lock. The parking lock serves for a firm fastening of the mirror head in the normal operating position and in the position/parking position pivoted opposite the direction of travel. In the normal operating position the parking lock acts as a locking element and secures the mirror head from uncontrolled pivoting or oscillation, in which the parking lock forces the mirror head onto the mirror foot with continuous bias. During the pivot process into the parking position of the outside rear view mirror, the parking lock is pivoted from this locking position over the U-shaped shoulder and slides along a cam shape of the parking lock to a stop which corresponds to the parking position of the outside rear view mirror.

The U-shaped shoulder reduces friction between the parking lock and the support of the mirror head in that, in the plastic components (support, parking lock) of the U-shaped shoulder that come in contact when under load, the plastic components only touch linearly at two sites. To further reduce friction the U-shaped shoulder can be provided with an easily sliding coating. The U-shaped shoulder also has the task of transferring the force acting between the parking lock and the support and distributing it to the hinge axes. By this distribution of forces to several components and sections, damage or failure after frequent pivoting is reliably avoided.

Another variant represents the use of an additional securing element advantageously designed as a retaining clip to prevent overextension of the mirror head during a pivot movement forward in the direction of travel. In this case an additional, for example, U-shaped retaining clip is incorporated in the rear hinge receptacle to pivot together with the retaining clip acting as intermediate articulation. With its other end this additional retaining clip slides in an elongated hole of the support and because of its sliding possibility along the elongated hole it limits the pivot movement of the mirror head in the direction of travel. This additional retaining clip can be arranged in the internal region of the retaining clip forming the intermediate articulation.

Both retaining clips are simple bending parts made from a preferably non-corroding metal and can be produced simply and very cost effectively. The low weight and favorable distribution of the acting forces permits simple and less strongly dimensioned designs of the reinforcements and/or support sites in the mirror head and in the mirror foot.

BRIEF DESCRIPTION OF THE DRAWINGS

Additional features of the invention are apparent from the additional claims, the description and the drawings.

The invention is further explained by mean of two practical examples depicted in the drawings. In the drawings FIG. 5 shows a section through the outside rear view mirror in the parking lock plane retracted relative to the direction of travel.

DETAILED DESCRIPTION OF THE PREFERRED EMBODIMENTS

Figure 1:
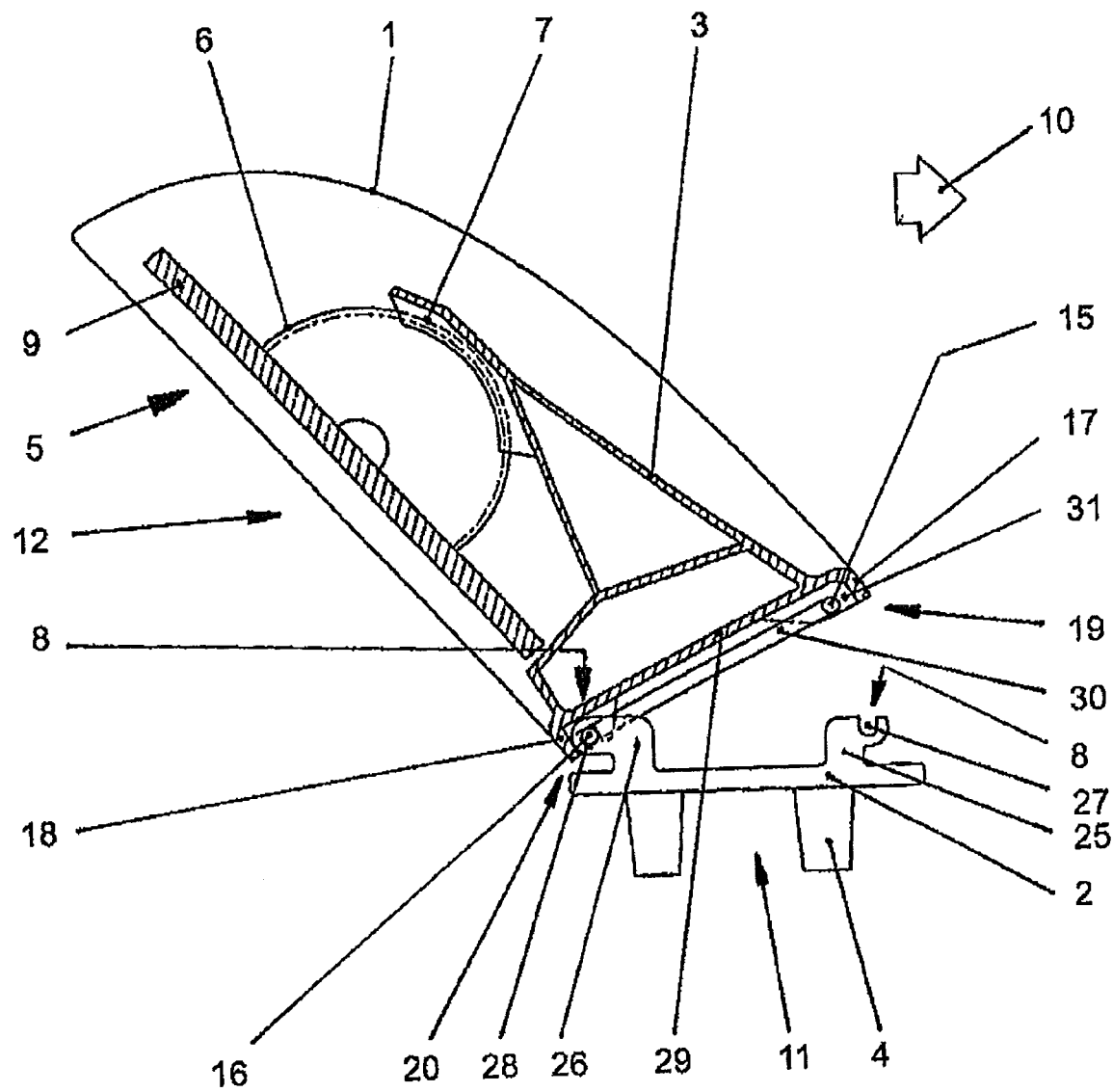
FIG. 1 shows a cross section through an outside rear view mirror in the deployed state opposite the direction of travel.

A cross section through an outside rear view mirror 5 in the state tilted opposite the travel direction 10 is shown in FIG. 1. The outside rear view mirror 5 consists essentially of the mirror head 12 and a mirror foot 11, which is fastened in known fashion to a vehicle. The mirror head 12 is mounted to be tilted forward or rearward on mirror foot 11 in the direction of travel 10.

The mirror head 12 has a housing 1 in which a mirror support 9 is arranged. It can be pivoted via an adjustment drive 6 and a gear mechanism 7 in the horizontal and/or vertical direction. The adjustment drive 6 is fastened in the rear area of the mirror 5 by common fastening devices, like screws, clips, etc. The gear mechanism 7 is firmly connected to a support 3 of the mirror head 12.

A mounting space 31 for a retaining clip or hinge clip 30 is provided on the side of mirror head 12 facing mirror foot 11. Mounting space 31 is limited essentially by a front housing wall 17 lying to the front in the direction of travel 10, a rear housing wall 18 and a bottom 29 that connects the housing walls. A front support 19 and a rear support 20 are arranged adjacent to the two housing walls 17, 18. The front support 19 has a front hinge 15, which can engage in a front bearing 25 via a plug section 8 and a front hinge mount 27. The rear support 20 is formed in the same manner. Here a rear hinge 16 is joined via the plug section 8 and a rear hinge mount 28 of a rear bearing 26.

Continuing reference to FIG. 1, a partial section of an articulation wire 30 in the two hinges 15, 16 engages via the plug section 8 into a recess of bearings 25, 26 that accommodates the articulation wire 30. Partial sections of the articulation wire 30 that are engaged here form a front and rear hinge/pivot legs 38, 39 (FIG. 3), depending on the tilting direction of the mirror head 12, around which the mirror head 12 can be pivoted relative to mirror foot 11.

In the position of mirror head 12 according to FIG. 1 the elements of the rear support 20 in the direction of travel 10 are engaged, in which case the rear hinge 16 is situated in the rear hinge mount 28. If the mirror head 12 now pivots around this hinge 16, removal of the mirror head 12 from the rear support 20 is prevented by the fact that the rear housing wall 18 of the mirror head 12 encloses the rear hinge mount 28. This enclosure area becomes larger with increasing pivot angle of the mirror head 12.

The rear hinge mount 28 is part of the rear bearing 26, which in turn is designed as an L-shaped component in one piece with mirror foot 11. If the mirror head 12 pivots rearward against the direction of travel 10, the rear hinge 16 is forced into the rear hinge mount 28. Reliable tilting/pivoting of the mirror head 12 is guaranteed merely by this type of movement.

Both bearings 25, 26 are designed in one piece with a bracket 2 of mirror foot 11, from which they protrude vertically. Shoulders 4 are provided on mirror foot 11 on the side of bracket 2 opposite bearings 25, 26. They are configured in their geometry so that they extend into corresponding recesses on the vehicle door or on another component attached to the vehicle and can be fastened.

Figure 3A:
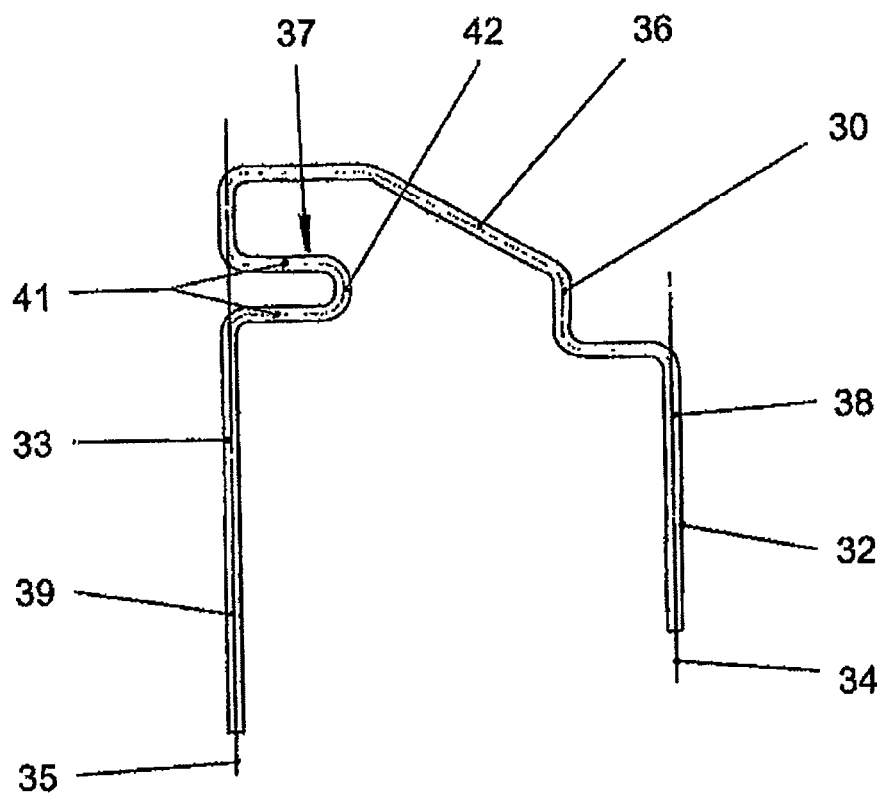
FIG. 3a shows a top view of the retaining clip.

A hinge axis 38, 39 is assigned to the hinges 15, 16 lying in the mounting space 31, each of which are formed by a retaining clip segment or a wire section 32, 33 (FIG. 3a). The sections 32, 33 are connected to each other by a connector 36. The parallel running straight sections 32, 33, which lie vertically relative to the outside rear view mirror 5, and the connector 36 are designed in one piece with each other.

If the mirror head 12 tilts, as shown (FIG. 1), opposite the direction of travel 10, the pivot axis is formed by the rear hinge axis 39 of articulation wire 30. The articulation wire 30 during such tilting of the mirror head 12 remains with its unengaged area in recess 31 of mirror head 12 during the entire pivot process. The articulation wire 30 therefore pivots in the same manner and same direction as mirror head 12. During tilting in the direction of travel 10 of mirror head 12 the articulation wire 30 behaves in the opposite manner and remains essentially parallel to bracket 2, positioned in both bearings 25, 26.

Figure 2:
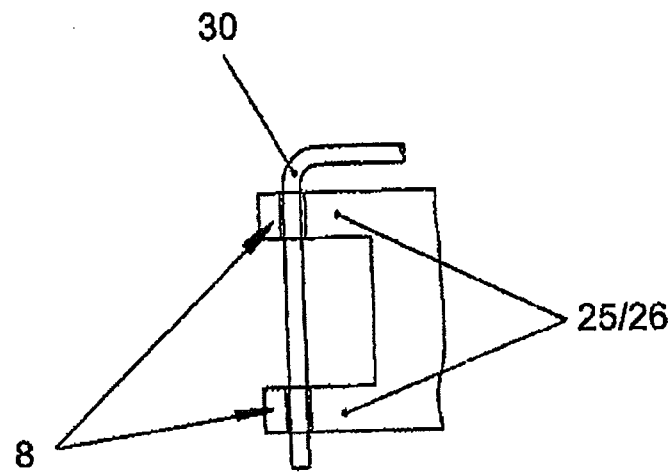
FIG. 2 shows a support with retaining clip.

As already mentioned, the bearings 25, 26 are one-piece L-shaped components molded onto bracket 2. The free arm of the front bearing 25 points forward in the direction of travel 10, whereas the free arm of the rear bearing 26 is aligned opposite the direction of travel 10. In order to permit secure pivoting around the corresponding hinge legs 38, 39, the corresponding retaining clip segment 38, 39 of articulation wire 30 engages in at least two L-shaped bearings 25, 26 lying one behind the other with spacing per pivot axis and side (FIG. 2). Naturally several such L-shaped bearings 25, 26 per pivot axis and side can also be provided. If several L-shaped bearings 25, 26 are used in the rear or front support 20, 19, the support forces are distributed over the number of corresponding L-shaped bearings 25, 26. The design becomes more stable on this account and withstands greater loads.

Figure 3:
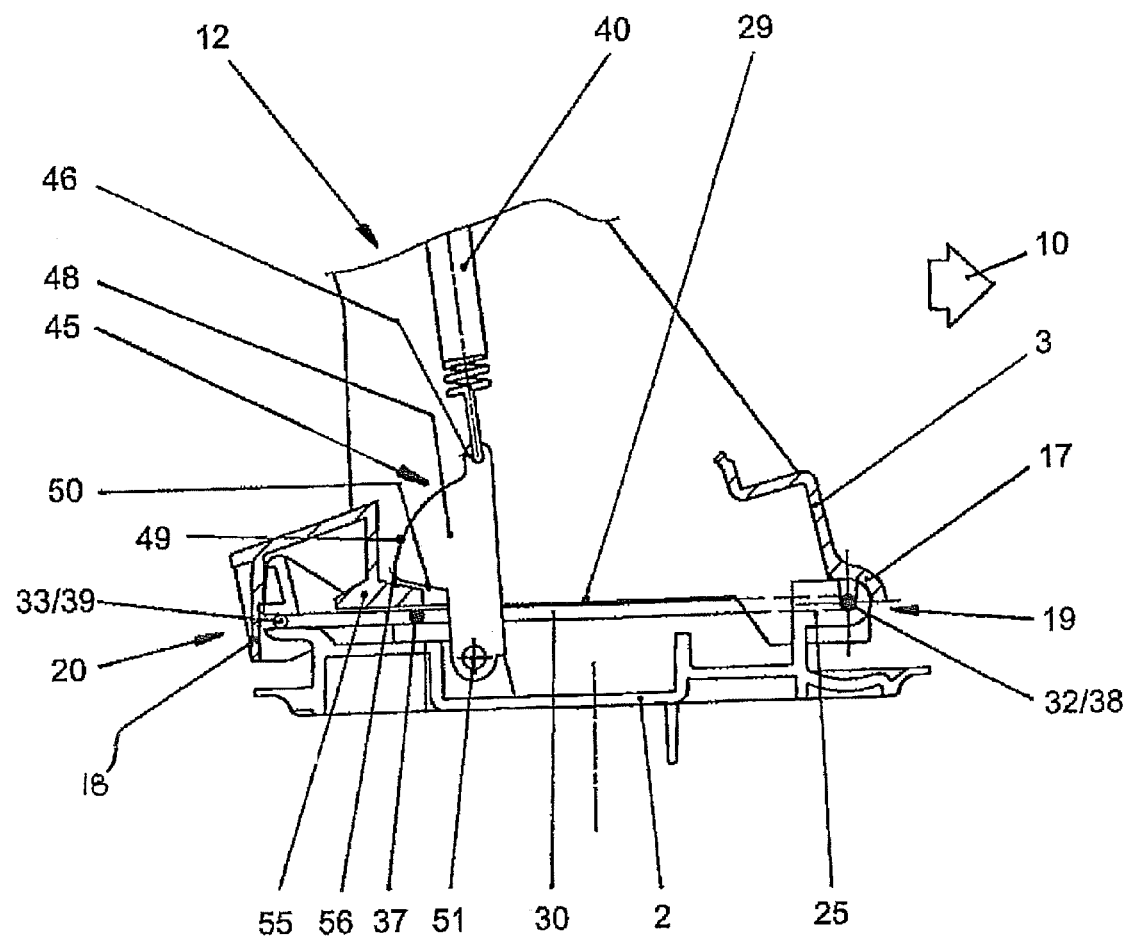
FIG. 3 shows a section through the outside rear view mirror in the parking lock plane in the normal operating position.

A section through the outside rear view mirror 5 in the parking lock plane and in the normal operating position is shown in FIG. 3. In this section the essential components and design embodiments that were not shown in FIG. 1 are depicted.

In the operating position or in the state tilted rearward in the direction of travel 10 the mirror head 12 must be securely fastenable in these positions. This fastening is necessary so that uncontrolled pivoting or oscillation of the mirror head 12 is prevented. Such a secured position is achieved by the use of a fastening component, the parking lock 45.

In the normal operating position of the outside rear view mirror 5 the rear support 20 and the front support 19 are simultaneously engaged. The bottom 29 of the mounting space 31 is situated essentially in parallel alignment to bracket 2, which in turn is again aligned essentially parallel to the corresponding mounting area of the vehicle. In order for lifting out of both or one of the supports 19, 20 to be prevented, the mirror head 12 is pulled with all its components into the bearings 25, 26 by at least one tension spring 40. In this case, the straight articulation wire segments 32, 33 of the front and rear hinge legs 38, 39 are engaged with the bearings 25, 26 and transfer the pressure force that acts through tension spring 40.

The tension spring 40 is suspended in a spring eye 46 of the parking lock 45. Parking lock 45 serves as an intermediate element between tension spring 40 and bracket 2 and is mounted on bracket 2 with its slender end above a pivot axis 51. Parking lock 45 has a cam-shaped shoulder 48 on its rear side in the direction of travel 10, which is designed straight on the side facing pivot axis 51 and curved on the side facing spring 40. The straight side of cam 48 is designed as a stop 50 of the parking lock 45. In the normal operating position of the outside mirror 5 the stop 50 of parking lock 45 lies against a corresponding surface 56 of bracket 2.

Figure 3B:
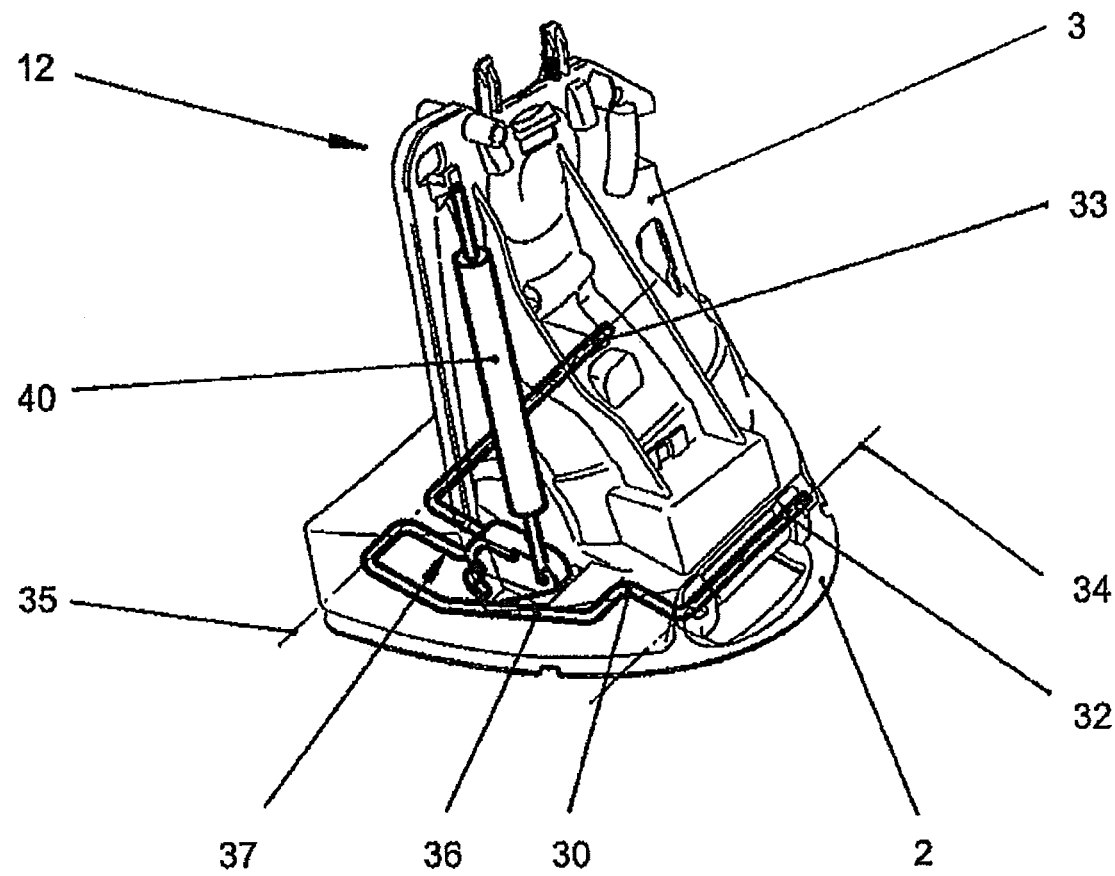
FIG. 3b shows a perspective view of FIG. 3.

In this normal operating position the tension spring 40, viewed in a top view according to FIG. 3, is sloped slightly rearward in direction of travel 10. By the sloping of spring 40, in the normal operating position the parking lock 45 with its stop 50 is permanently forced onto the stop 56 of bracket 2. This stop 50, 56 is therefore always under bias so that a firm fastening between mirror foot 11 and mirror head 12 is guaranteed during operation. Oscillation and tilting of the mirror head 12 is therefore reliably prevented. In this position the articulation wire 30 with its front wire section 32 is engaged with the front support 19 and with its rear wire section 33 engaged with the rear support 20. Both engaged wire sections 32, 33 are congruent in this position of the normal operating position with the two pivot axes 34 and 35 and lie in the same plane with them (see FIG. 3b).

FIG. 3a shows a plane view of the articulation wire 30. The front pivot axis 38 of articulation wire 30 is formed by the front wire section 32. It lies essentially parallel to the rear wire section 33 that forms the rear pivot leg 39. The spacing between the two wire sections 32 and 33 corresponds to the spacing between the bearing 25 and rear bearing 26. Both wire sections 32, 33 are connected to each other via the connector 36 of articulation wire 30. The other shaping of connector 36 corresponds to the geometric configurations and circumstances of mounting space 31 as well as possible geometric shapes of bracket 2. On the side of the rear pivot leg 39 the rear wire section 33 is equipped with a U-shaped bend 37 near connector 36. It has two parallel arms 41 that extend perpendicular to the wire section 33 in the direction toward wire section 32 and are connected to each other by an advantageously curved connector 42.

Figure 4:
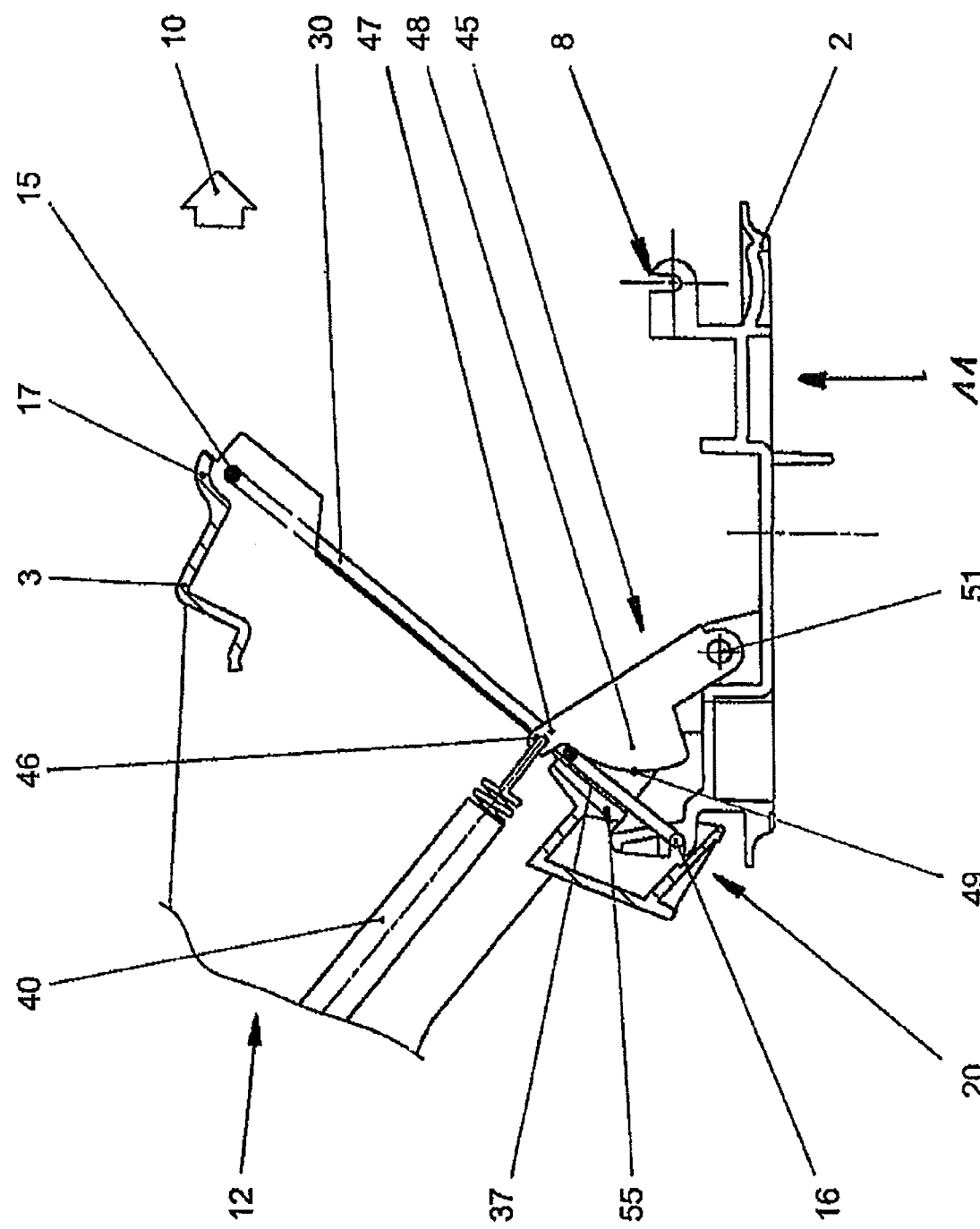
FIG. 4 shows a section through the outside rear view mirror retracted in the direction of travel in the parking lock plane.

During pivoting of mirror head 12 against the direction of travel 10, the U-shaped bend 37 of articulation wire 30 slides along a curved sliding surface 49 of cam 48, which is provided on the rear wall of parking lock 45 in the direction of travel 10. Because of this sliding U-shaped bend 37 on sliding surface 49, easy friction-reduced pivoting of the mirror head 12 is made possible. In addition, the sliding surface 49 of cam 48 as well as connector 42 are coated for further reduction with a friction-reducing coating. Since the cam 48 with its sliding surface 49 is preferably made of plastic, just like the counterstop 56 of bracket 2, and experiences an elastic deformation during loading, this deformation, as well as mechanical damage, is largely prevented by sliding of the metal U-shaped bend 37 on sliding surface 49. At the end of this pivot movement the U-shaped bend 37 of articulation wire 30 comes in contact with an eye-shaped shoulder 47 of cam 48 (FIG. 4). This contact corresponds to the function of an end stop. The shoulder 47 has spring eye 46 and is provided on the side of cam 48 facing away from bracket 2.

In the tilted back state the parking lock 45 is pivoted rearward against travel direction 10 around axis 51 far enough so that it assumes an oblique position (FIG. 4). The slope of parking lock 48 relative to spring 40 causes continuous pressing of the U-shaped bend 37 against a support 55 of mirror head 12. It is therefore secured in this pivoted position under bias free of tilting and oscillation. Because of the parking lock 45 and spring 40 lying in the almost extended position, loosening from the pivoted almost locked position is only possible with difficulty. When mirror head 12 is pivoted back into the operating position, reduced friction between the U-shaped bend 37 and parking lock 45 is advantageous.

If mirror head 12 pivots back into its normal operating position, the U-shaped bend 37 is forced by support 55 of mirror head 12 in the direction toward parking lock 45. During this movement the force acting on the U-shaped bend 37 is supported via the rear hinge axis 39 of the rear hinge 16 over the rear bearing 26 in bracket 2. This force acting on the U-shaped bend 37 is also transferred via connector 36 into the area of the front hinge 15. The entire articulation wire 30 is therefore used for force transfer and therefore acts as an additional reinforcing component. As a result, wall sections, supports, struts and the like can be made weaker in the mirror head 12, which results in a corresponding saving of material and therefore a reduction in weight, volume and cost.

The force introduced into the U-shaped bend 37 when during pivoting back over mirror head 12 seeks to overcome the U-shaped bend 37 supported via parking lock 45 relative to the rear hinge axis 39. This torsion is prevented by the fact that the rear wire section 33 of the rear hinge axis 39 is connected via connector 36 to the front wire section 32 of the front hinge axis 38. The torsion is therefore counteracted via the connector 36 and the front wire section 32.

The front wire section 32 is fastened in the front hinge 15 of the mirror head 12. Because of this the articulation wire 30 during pivoting against the travel direction 10 is always arranged in this position relative to the mirror head 12. The U-shaped bend 37 is returned to its initial position during backward movement of mirror head 12 via the sliding surface 49 of cam 48. The parking lock 45 is moved back again with its stop 50 onto the counterstop 56 of bracket 2 and the mirror head 12 is again locked on this account to the bracket 2 in a firmly fixed position.

Figure 4A:
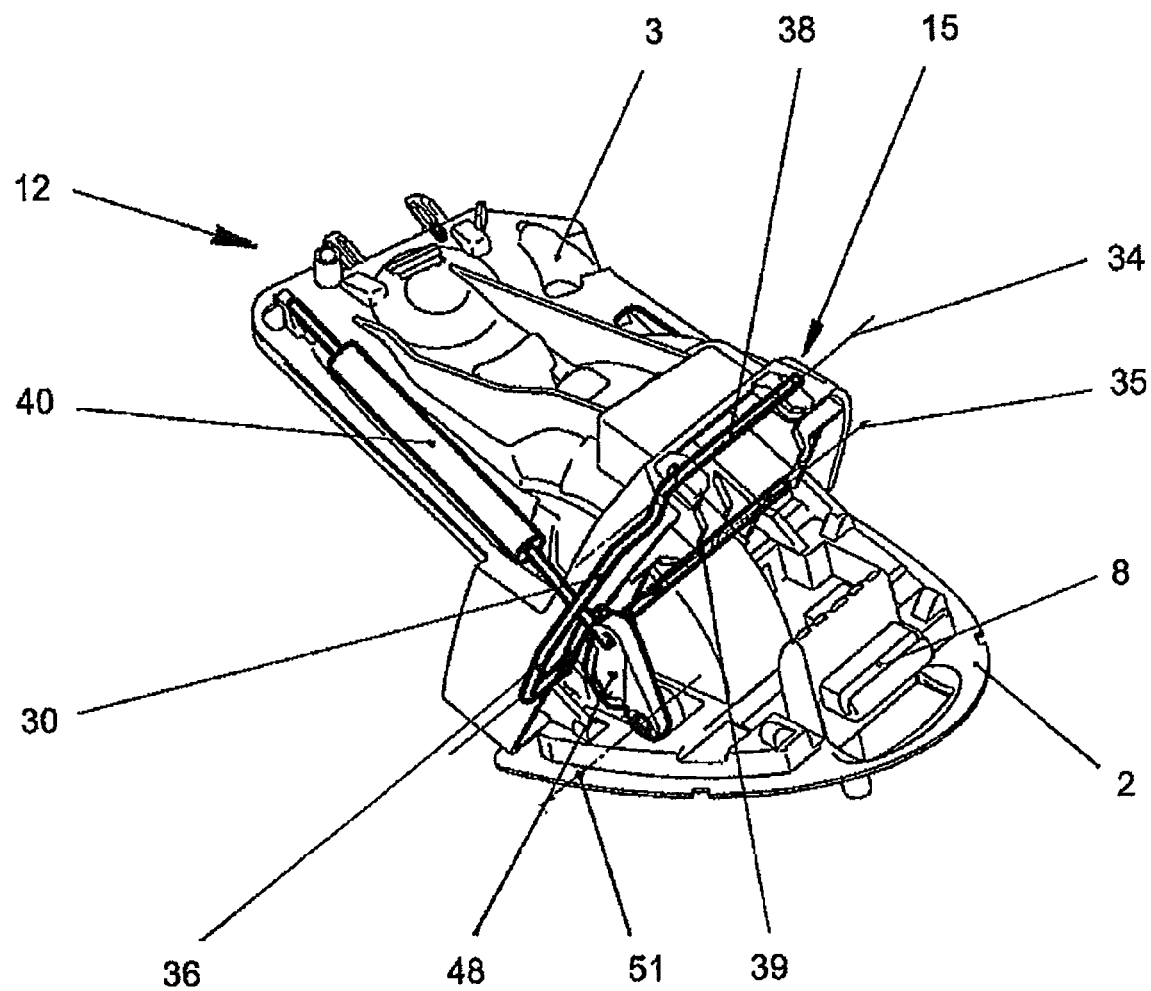
FIG. 4a shows a perspective view of FIG. 4.

In the perspective view of FIG. 4a the positioning of the articulation wire 30 with the front rear hinge axis 38, 39 as well as the U-shaped bend 37 between the mirror head 12 and the cam 48 of the parking lock 45 are readily apparent. In this representation it is clear how the articulation wire 30 co-pivots according to the mounting space 31 of mirror head 12. The front pivot axis 34 is held in the front hinge 15 of support 3.

Figure 5A:
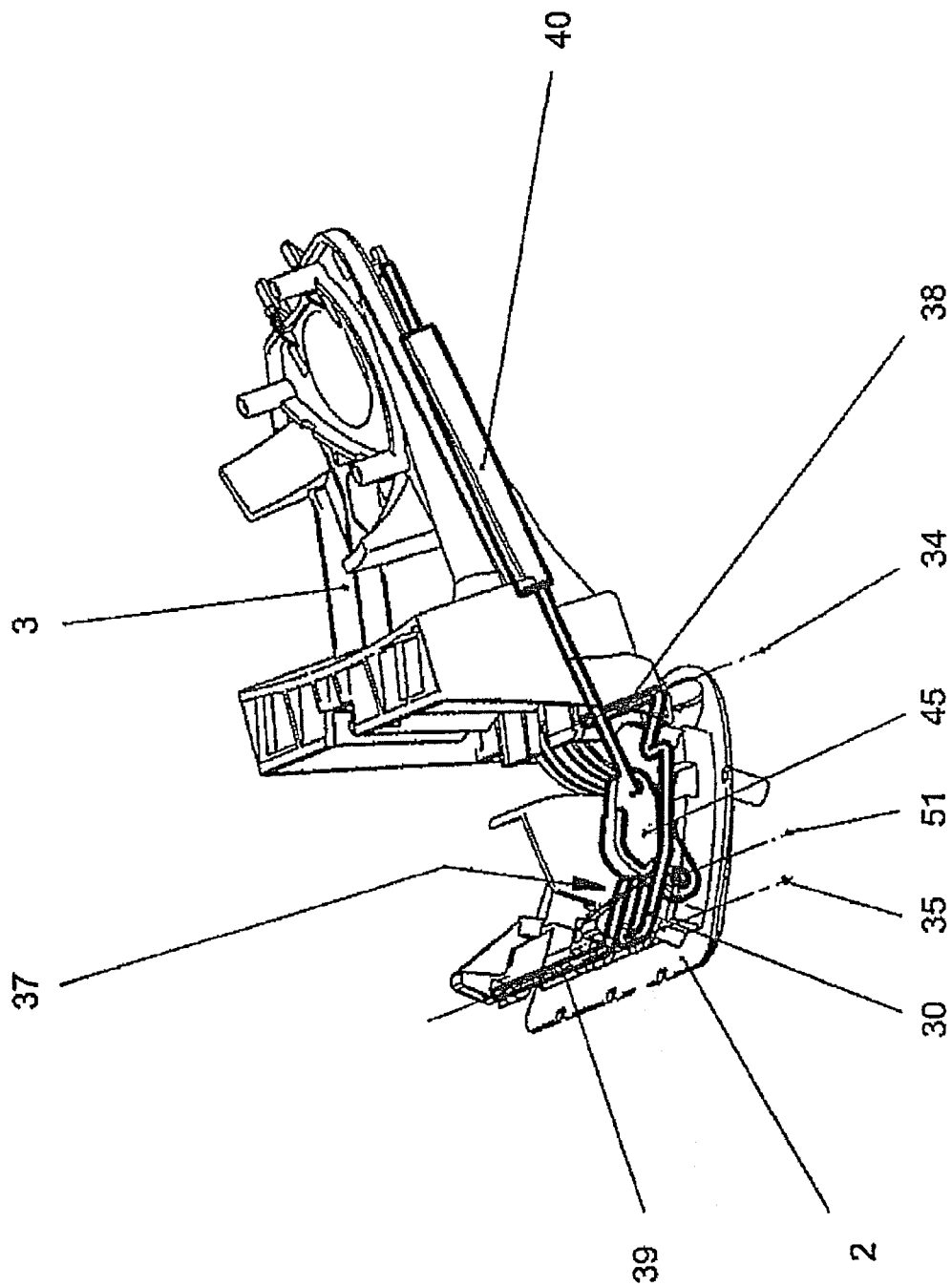
FIG. 5a shows a perspective view of FIG. 5.

The mirror head 12 in FIG. 5 is pivoted forward in travel direction 10. The front support 19 of mirror head 12 is engaged with the front bearing 25. During this pivot movement loosening of the front support 19 is also prevented by the housing wall 17 that engages in the front. Opposite the pivoting of mirror head 12 described with reference to FIG. 4 in travel direction 10 rearward the articulation wire 30 in this case remains in an unpivoted position in which the articulation wire 30 is situated essentially parallel to bracket 2. The rear support 20 in this case is free of force.

In the pivoted position according to FIG. 5 the spring 40 and parking lock 45 are in the almost extended position. No area of cam 48 is in contact with the retaining clips 30 or another part of the support 2 or mirror head 12. This is also not necessary, since during pivoting in travel direction 10 forward locking (fastening) of mirror 5 is not desired. For example, should the mirror 5 be tilted back by a passing vehicle in the travel direction, immediate return of the mirror 5 to the normal use position is desired.

The mirror head 12 can tilt forward from its use position according to FIG. 3 without a problem in the travel direction 10 if a corresponding force is exerted on it. It pivots in the described manner around leg 38. The parking lock 45 is pivoted in the same direction around axis 51 via tension spring 40. The parking lock 48 is then raised with its stop 50 from the counterstop 56.

By immediate release of parking lock 45 from its locked position and pivoting of parking lock 45 around pivot axis 51 in the direction of travel 10 forward it is possible for the mirror 5 to be moved forward very quickly and very easily in travel direction 10. The position arrangement of the articulation wire 30 as well as the approximate extended position spring 40 and parking lock 45 are apparent in the perspective view of FIG. 5a. The parking lock 45 not in engagement with the U-shaped bend 37 is also apparent in this view.

Figure 6:
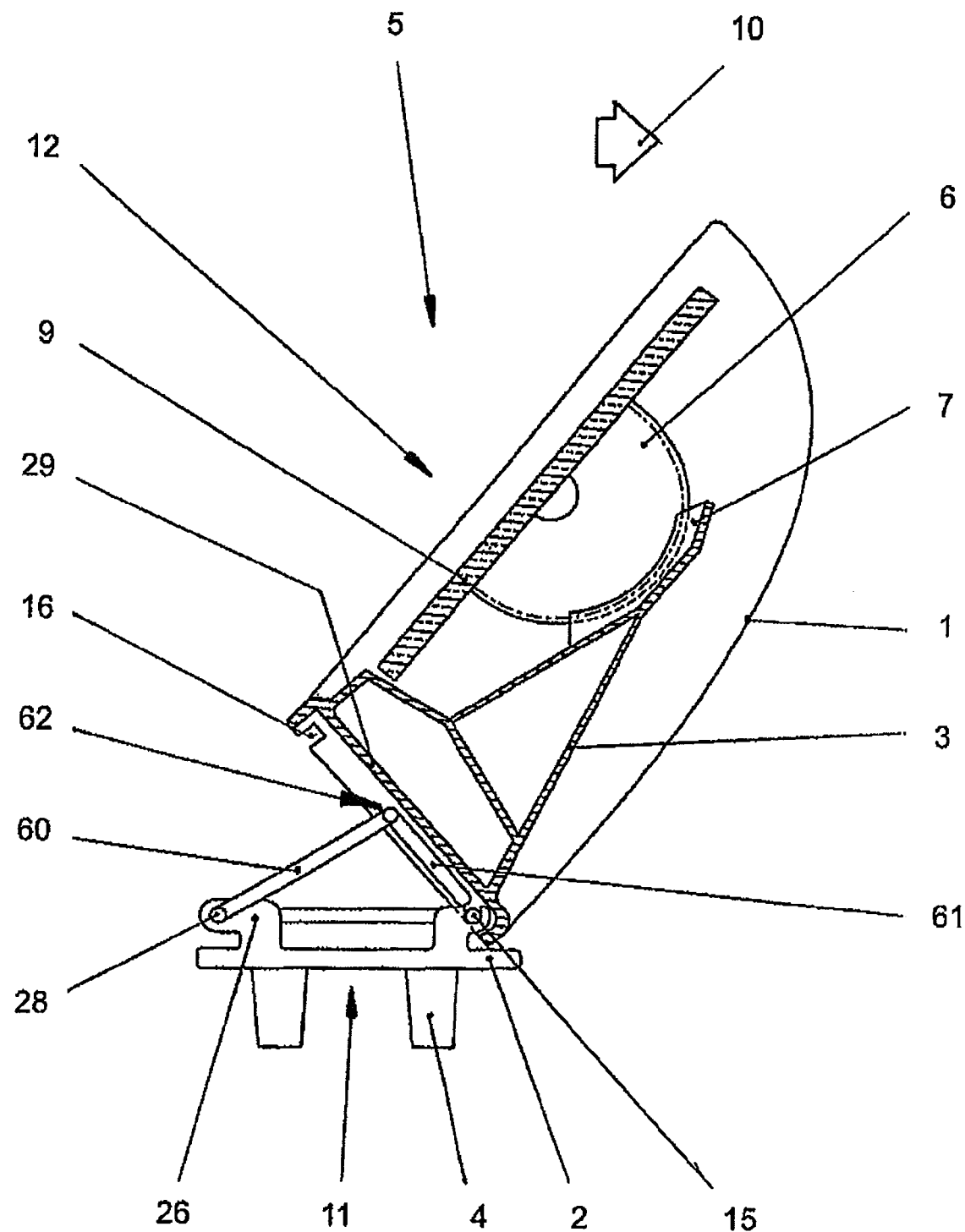
FIG. 6 shows a cross section through the outside rear view mirror retracted in the direction of travel and a pivot limitation acting in the direction of travel.

As an additional variant to secure mirror head 12 a clamp 60 is incorporated in FIG. 6 as a pivot limitation. This clamp 60 is bent U-shaped and arranged to pivot with one end in the rear hinge mount 28. The opposite end of clamp 60 is accommodated in an elongated hole 61 in the mounting space 31 with support 3. If the mirror head 12 is pivoted forward in travel direction 10 the end of clamp 60 facing mirror head 12 slides according to the extent of the elongated hole 61 up to the end 62 of the elongated hole 61 facing the rear hinge 16. The clamp 60 in this case assumes an extended position limited by elongated hole 61 and therefore acts as a tension element between mirror head 12 and mirror foot 11. Because of this pivot limitation of clamp 60 damage to the support 19, especially the front bearing 25 and the front housing wall 17 by an unduly large pivot angle, is prevented.

Figure 7:
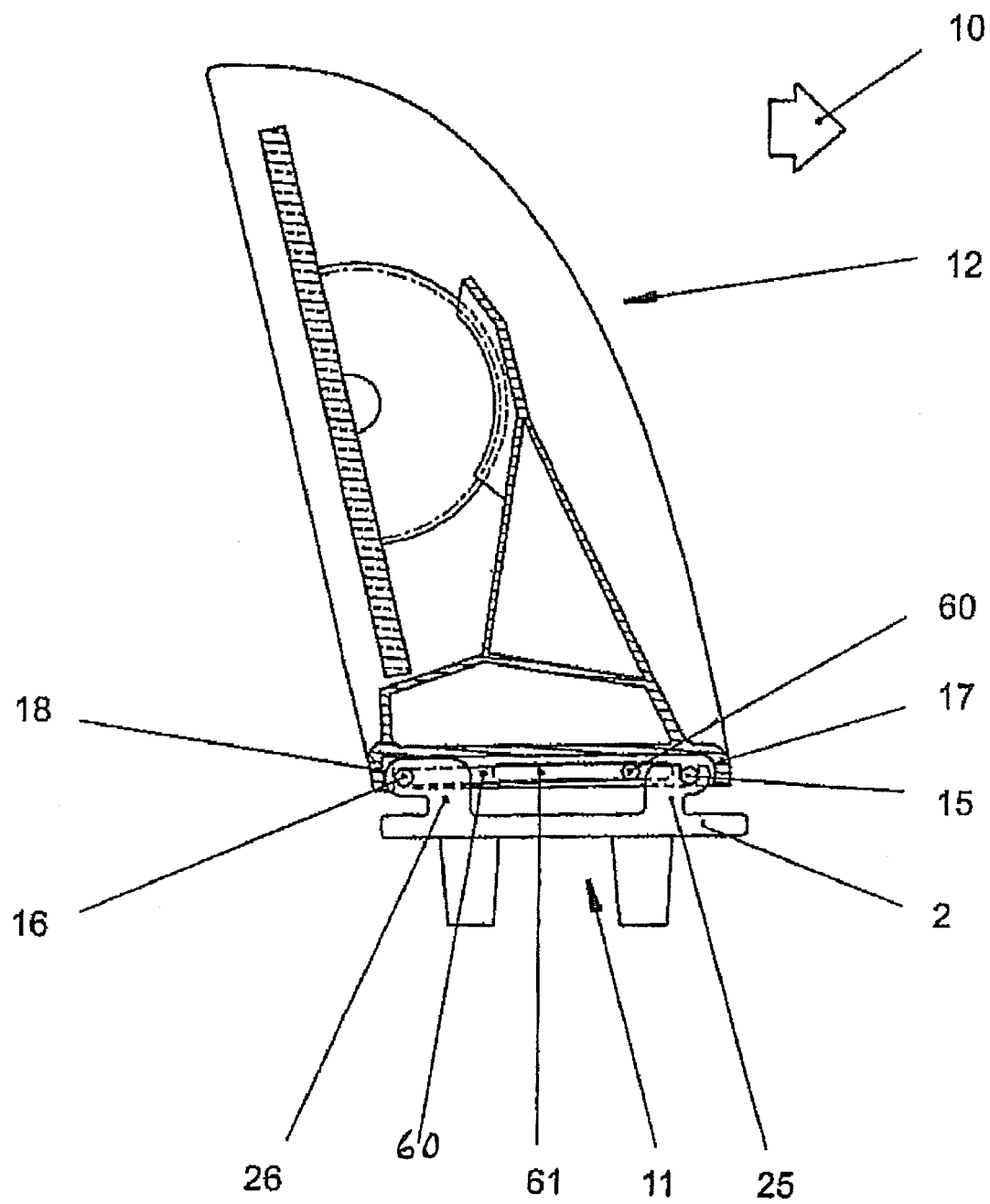
FIG. 7 shows a cross section through an outside rear view mirror in the normal operating position and the resting pivot limitation.

The extent of the elongated hole 61 is chosen so that the clamp 60 cannot reach a blocking extended position between its mount on the bracket side and the mirror head 12. This is necessary so that immediate return of the mirror head 12 is possible during pivoting in the travel direction 10. Consequently, because of the extent and positioning of elongated hole 61, locking of the mirror head 12 in the state tilted forward in travel direction 10 is prevented. If the mirror head 12 tilts back into its normal operating position, the end of clamp 60 facing the mirror head 12 slides in elongated hole 61 until the clamp 60 and elongated hole 61 are situated in the plane congruent with the plane of the normal operating position. The elongated hole 61 and clamp 60 are then situated together in mounting space 31 (see FIG. 7). Naturally the end of clamp 60 facing mirror foot 11 can also be mounted to pivot on another location of the rear bearing 26 or bracket 2. More than one clamp 60 can also be used for pivot angle limitation.

The invention claimed is:

1. An outside rear view mirror assembly for a motor vehicle, said outside rear view mirror assembly comprising:
   a mirror foot fixedly securable to the motor vehicle, said mirror foot including a bracket;
   a mirror head pivotable into and against a direction of travel relative to said mirror foot, said mirror head including a housing and a mirror support disposed in said housing; and
   an articulation wire defining two parallel hinge legs (38, 39) allowing said mirror head to pivot into and against the direction of travel thereabout, respectively, said articulation wire including a U-shaped shoulder stop (37) extending through a plane defined by said two parallel legs for stopping the pivoting of said mirror head after said mirror head pivots a predetermined amount and a connection section (36) connecting one of said two parallel hinge legs with said U-shaped shoulder stop (37), said connection section (36) adapted in its shape to inside contours of said mirror head (12) and said mirror foot (11) such that said U-shaped shoulder stop (37) is disposed between one of said two parallel hinge legs and said connection section (36);
   said U-shaped shoulder stop (37) including (i) arms (41) that extend orthogonal to said two parallel hinge legs, and (ii) a connector (42) running parallel to said two parallel hinge legs;
   a parking lock (45) operatively connected between said bracket and said mirror head, said parking lock receiving said connector (42) thereagainst; and
   a friction-reducing coating covering said connector (42) of said U-shaped shoulder stop (37) to reduce friction created between said connector and said parking lock.

2. An outside rear view mirror according to claim 1, wherein said parking lock includes a curved sliding surface (49) providing a cam surface for said connector (42) of the U-shaped shoulder (37) when the mirror head (12) is moved to and from a parking position.

3. An outside rear view mirror according to claim 2 including bearings (25, 26) extending out from said mirror foot (11) to receive said two parallel hinge legs.

4. An outside rear view mirror according to claim 3 wherein the articulation wire (30) in a normal operating position is positioned essentially parallel to said bracket (2).

5. An outside rear view mirror according to claim 4 wherein said bearings (25, 26) in the normal operating position of mirror head (12) extend fully into said mirror head.

6. An outside rear view mirror according to claim 5 wherein each of said bearings (25, 26) includes a plug section (8) designed to receive one of said two hinge legs.

7. An outside rear view mirror according to claim 6 wherein one of said rear bearings (25, 26) consists of several individual bearings connected to each other.

* * * * *